United States Patent [19]
Yoshida

[11] Patent Number: 4,823,363
[45] Date of Patent: Apr. 18, 1989

[54] PHASE-LOCKED CLOCK REGENERATION CIRCUIT FOR DIGITAL TRANSMISSION SYSTEMS

[75] Inventor: Yasuharu Yoshida, Tokyo, Japan
[73] Assignee: NEC Corporation, Japan
[21] Appl. No.: 882,163
[22] Filed: Jul. 7, 1986
[30] Foreign Application Priority Data Jul. 9, 1985 [JP] Japan .................................. 60-152024
Jul. 9, 1985 [JP] Japan .................................. 60-152026

[51] Int. Cl.⁴ ....................... H03D 3/24; H04L 25/49; H04J 3/06
[52] U.S. Cl. .................................... 375/120; 370/100; 375/20
[58] Field of Search ................... 375/20, 81, 120, 119; 370/100

[56] References Cited

U.S. PATENT DOCUMENTS

| | | | |
|---|---|---|---|
| 3,760,111 | 9/1973 | Sawai ...................................... | 375/20 |
| 3,983,501 | 9/1976 | Lindstrum .............................. | 375/81 |
| 4,143,322 | 3/1979 | Shimamura .......................... | 375/81 |
| 4,217,551 | 8/1980 | Entenman .............................. | 375/81 |
| 4,393,516 | 7/1983 | Itani ................................. | 375/120 X |
| 4,571,549 | 2/1986 | Lods et al. ............................. | 375/39 |
| 4,615,041 | 9/1986 | Koskinen ............................. | 375/114 |
| 4,617,679 | 10/1986 | Brooks ................................. | 375/120 |
| 4,635,280 | 1/1987 | Smith et al. ......................... | 375/120 |

Primary Examiner—Stephen C. Buczinski
Assistant Examiner—Linda J. Wallace
Attorney, Agent, or Firm—Laff, Whitesel, Conte & Saret

[57] ABSTRACT

In a digital transmission system, a clock regeneration circuit includes a phase-locked loop having a low-pass filter, a voltage-controlled oscillator connected thereto, and a phase comparator for supplying to the low-pass filter a signal representative of the phase difference between an incoming two-level data bit stream and the output of the voltage-controlled oscillator. The incoming data bit stream is converted into a plurality of parallel data bit streams and fed to a multi-level quadrature amplitude modulator in response to a clock signal derived from the output of the voltage-controlled oscillator and converted into an outgoing multi-level digital signal. An incoming CMI (coded mark inversion) coded binary signal is sampled by a flip-flop for in response to the output of the voltage-controlled oscillator to supply an output signal to the VCO through the low-pass filter.

7 Claims, 3 Drawing Sheets

PHASE-LOCKED CLOCK REGENERATION CIRCUIT FOR DIGITAL TRANSMISSION SYSTEMS

BACKGROUND OF THE INVENTION

The present invention relates generally to digital transmission systems, and more particularly to clock regeneration using a phase-locked loop.

In 16-level quadrature amplitude modulation, a technique currently in use for high efficient spectral utilization, an incoming digital bit stream is converted by a serial-to-parallel converter to four parallel bit streams and time-compressed to allow insertion of redundant bits and quadrature amplitude modulation is effected upon a carrier with the bit streams. To effect these conversion and modulation, the clock information of the incoming bit stream is detected using a tank circuit tuned to the clock frequency. However, a dropout in the incoming bit stream causes the timing of the serial-to-parallel conversion to be seriously affected. More specifically, the serial-to-parallel converter includes a counter that divides the clock signal by a factor of four. The lower-frequency clock signal which is used to effect the serial-to-parallel conversion is fed to a time-compression and scrambling circuit where it is converted to a higher frequency at which the parallel bit streams are time-compressed to allow for insertion of redundant bits. This higher-frequency clock is generated by a circuit including a phase-locked loop. This phase-locked loop has a transient response time which is determined in consideration of the response time for clock regeneration at the receiving end of the digital transmission link. A dropout in the incoming bit stream would cause the frequency dividing counter to stop. Upon recovery, it resumes count operation starting with the count where it is stopped. Because of the indefiniteness of the count where the count operation is re-started, there is a discrete amount of phase shift at the output of the counter which amounts to an integral multiple of 90 degrees. The phase-locked loop by which the higher-frequency clock is generated cannot follow the discrete phase shift because of its large response time. Therefore, the higher-frequency clock is out of phase with the correct timing, resulting in a loss of data bits or a regeneration of same data bits. The transient response time of the higher-frequency phase-locked loop is at a maximum when the phase shift is 180 degrees, typically in a range between several milliseconds to several tens of milliseconds. Thus, even if the dropout lasts for as little as a few hundreds nanoseconds, bit errors can occur, which is likely to be interpreted as a circuit failure.

SUMMARY OF THE INVENTION

It is therefore an object of the present invention to provide a digital transmission system having a phase-locked clock regeneration circuit which is immune to dropouts in the incoming data bit stream.

Specifically, the digital transmission system of the present invention comprises a phase-locked loop having a low-pass filter, a voltage-controlled oscillator connected thereto, and a phase comparator for supplying to the low-pass filter a signal representative of the phase difference between an incoming two-level data bit stream and an output of the voltage-controlled oscillator and generating a first, lower-frequency clock signal from the voltage-controlled oscillator. A serial-to-parallel converter is provided for converting the incoming data bit stream into a plurality of parallel data bit streams in response to the first clock signal and deriving from the first clock signal a second, higher-frequency clock signal synchronized with the parallel data bit streams. The parallel data bit streams are converted into an outgoing multi-level digital signal in response to the second clock signal.

For transmission of a CMI (coded mark inversion) coded binary signal, the phase comparator preferably comprises a flip-flop having a first input terminal connected to be responsive to the CMI coded binary signal and a second input terminal responsive to the output of the voltage-controlled oscillator for sampling the CMI coded binary signal. Furthermore, the output of the voltage-controlled oscillator is preferably delayed so that first and second output signals are generated which are respectively delayed and advanced with respect to the output of the voltage-controlled oscillator by a predetermined amount and applied to the clock inputs of second and third flip-flops for sampling the CMI coded binary signal for coupling to a decoder the output of which is connected to the serial-to-parallel converter.

BRIEF DESCRIPTION OF THE DRAWINGS

The present invention will be described in further detail with reference to the accompanying drawings, in which.

DETAILED DESCRIPTION

Figure 1:
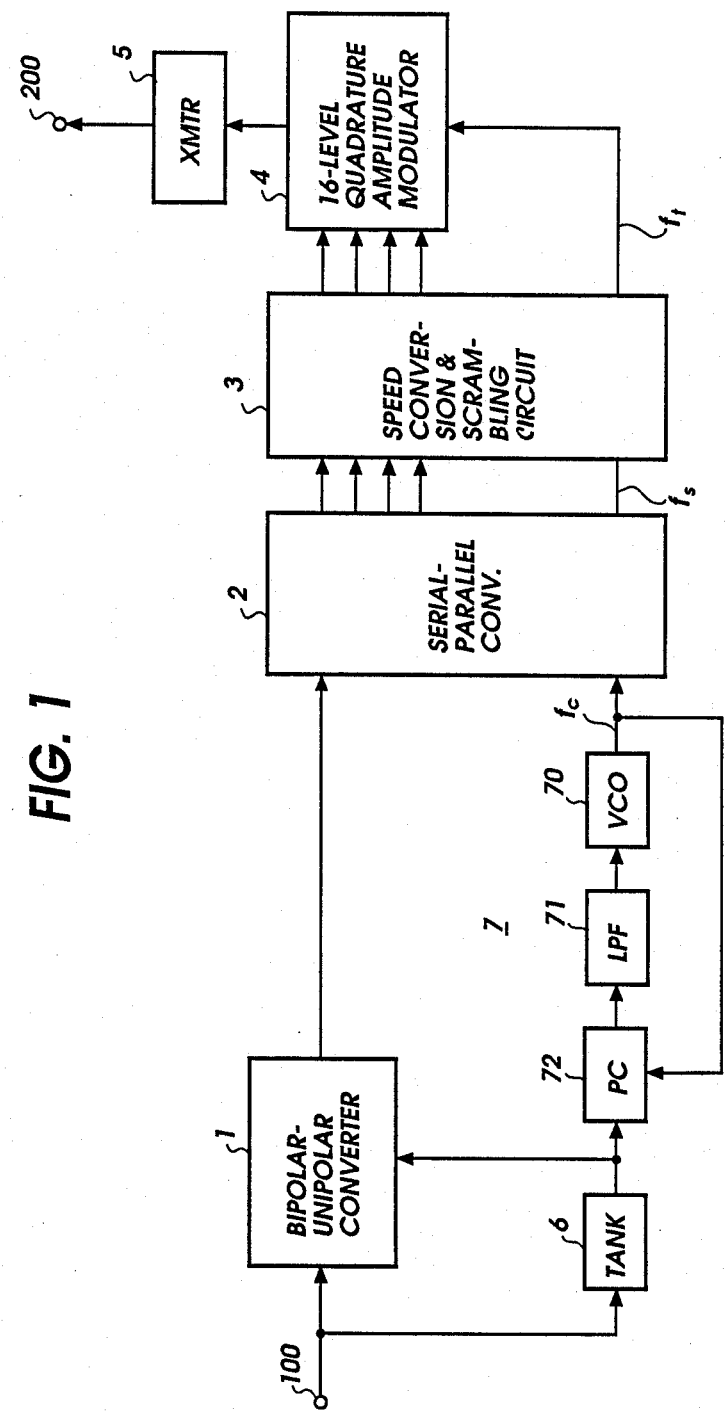
FIG. 1 is a block diagram of a digital transmission system according to a first embodiment of the present invention.

Referring now to FIG. 1, there is shown a 16-level quadrature amplitude modulation digital radio transmission system embodying the present invention. An incoming binary data stream of alternate mark inversion (AMI) code, or bipolar return-to-zero (BRZ) code is received at terminal 100 and applied to a bipolar-to-unipolar converter 1 and a tank circuit 6. Tank circuit 6 is tuned to the clock frequency fc of the input bit stream to supply a clock signal fc to the converter 1 to cause it to convert the received bit stream into a unipolar code. The clock signal fc is also applied to a phase-locked loop 7 which essentially comprises a voltage-controlled oscillator 70, a low-pass filter 71 and a phase comparator 72. Phase comparator 72 detects a phase difference between the output of the VCO 70 and the incoming bit stream and controls the frequency of the VCO through the low-pass filter 71 in accordance with the detected phase difference. The output of VCO 70 is locked in phase with the incoming bit stream and is stabilized at the clock frequency of the incoming bit stream against momentary loss of data, or "dropouts" in the incoming bit stream.

The output of phase-locked loop 7 is applied to a serial-to-parallel converter 2 where it is converted to frequency fs which is one-fourth of the clock frequency fc. Converter 2 accepts the unipolar bit stream from converter 1 and splits it into four parallel bit streams in response to clock signal fs and supplies the streams in synchronism with clock signal fs to a time-compression or speed conversion and scrambling circuit 3. Speed conversion and scrambling circuit 3 includes a frequency converter having a phase-locked loop for converting the clock signal fs to a higher clock frequency ft. The parallel data bit streams are compressed in time dimension in response to the clock signal ft and combined with redundant bits and scrambled, and fed to a 16-level quadrature amplitude modulator 4. Modulator 4 impresses the scrambled bit streams upon a carrier according to 16-level quadrature amplitude modulation using the clock signal ft, the modulated carrier being converted to a radio frequency and transmitted by a transmitter 5 to an output terminal 200.

Because the clock signal fc supplied to the serial-to-parallel converter 2 is phase-locked with the incoming bit stream, there is no momentary loss of clock information at the input of frequency divider even if there is a dropout in the incoming bit stream. As a result, the time compression and scrambling circuit 3 is stabilized against dropouts.

Whereas, the prior art digital transmission system is not provided with the phase locked loop 7. For this reason, a dropout in the incoming bit stream causes an interruption in the clock signal fc and upon recovery the phase of the clock signal fs assumes a value determined by the time at which the dropout occurs, so that there is a sudden phase shift of an integral multiple of 90 degrees in the clock signal fs. As a result, the phase-locked loop of frequency converter included in the speed conversion and scrambling circuit 3 is unable to follow the phase shift and hence the time-compression operation to increase the signal speed is out of timing and bit errors occur until phase lock condition is resumed in the time-compression and scrambling circuit 3.

Figure 2:
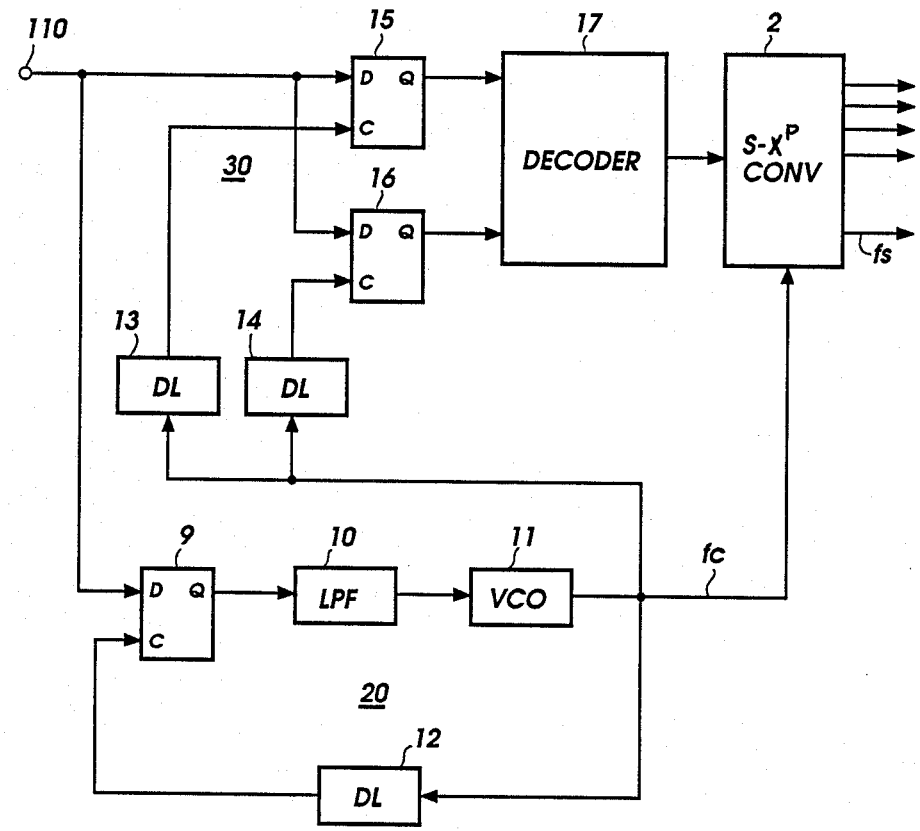
FIG. 2 is a block diagram of a second embodiment of the present invention.

FIG. 2 is a block diagram of another embodiment of the present invention. In this embodiment, the system accepts a CMI (Coded Mark Inversion) coded binary signal at input terminal 110. The system includes a phase-locked loop 20 comprising a D flip-flop 9, a low-pass filter 10, voltage-controlled oscillator 11 and a delay line 12. Flip-flop 9 has a data input terminal D coupled to the input terminal 110 and a clock input terminal C to the output of delay line 12. The Q output of flip-flop 9 is supplied through low-pass filter 10 to the VCO 11 and the output of VCO 11 is coupled to the input of delay line 12. The output of VCO 11 is further applied to delay lines 13 and 14. A sampling circuit 30 includes D flip-flops 15 and 16 having their data input terminals D coupled together to the input terminal 110 and their clock input terminals C connected respectively to the outputs of delay lines 13 and 14. The outputs of flip-flops 15 and 16 are connected to a CMI decoder 17. The output of decoder 17 and the output of VCO 11 are applied to the serial-to-parallel converter 2 as in FIG. 1.

Figure 3:
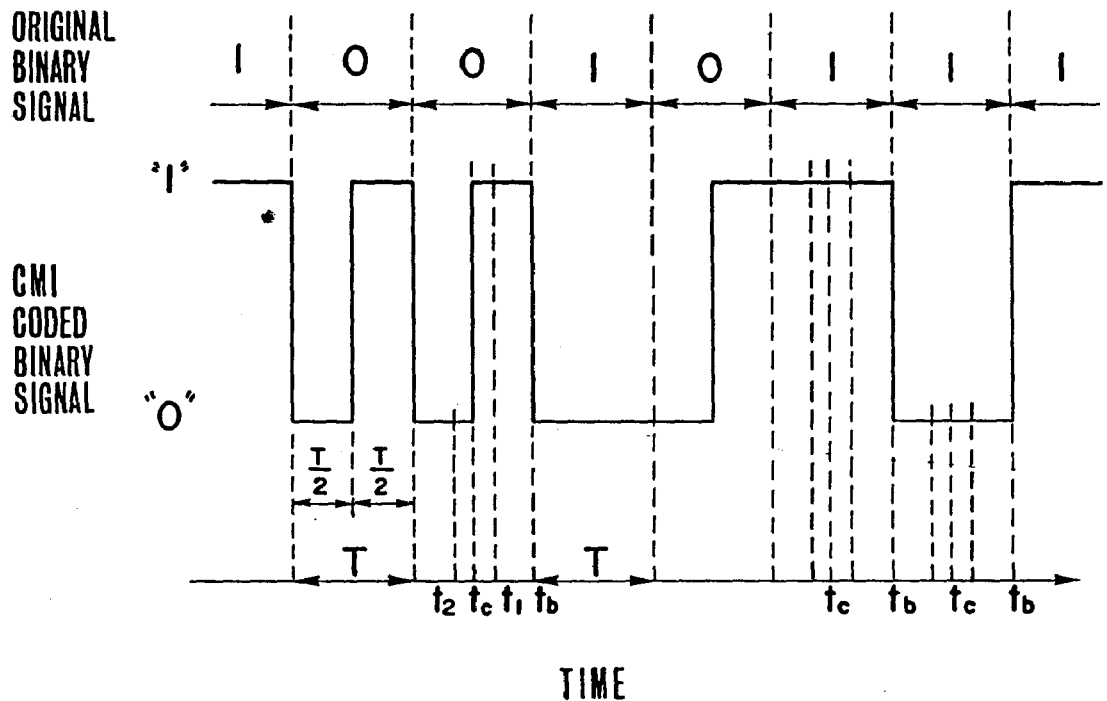
FIG. 3 is a waveform diagram of a typical CMI coded binary signal.

The operation of the circuit of FIG. 2 will be described with reference to FIG. 3 in which the waveform of a typical CMI coded binary signal is shown. As is well known in the transmission art, a CMI coded binary signal is a two-level non-return-to-zero code in which information bit "0" is coded so that both amplitude levels 1 and 0 are attained consecutively, each for half a unit time interval and in which information bit "1" is coded by either of the amplitude levels 1 or 0 for one full unit time interval in such a way that the level alternates for successive binary 1's. As shown in FIG. 3, there is a positive transition at the midpoint tc of the time slot T of an information bit "0", i.e., no negative transition occurs at the midpoint tc in the time slot of the information bit "0". Therefore, when the output of VCO 11 is switched to a high voltage level and the output of delay line 12 changes to a high level at time $t_1$ slightly advanced with respect to the midpoint tc, flip-flop 9 switches to logical "1". Conversely, if the output of delay line 12 switches to the high level at time $t_2$ slightly delayed with respect to the midpoint tc, flip-flop 9 switches to logical "0". Voltage-controlled oscillator 11 reduces its frequency in response to the logical "1" output of flip-flop 9 and increases its frequency in response to the logical "0" output of the flip-flop so that the clock timing is time-coincident with the midpoint tc. Because of the random occurrence of positive and negative transitions at time tb between successive binary digits as seen from FIG. 3, the output of VCO 11 is not controlled with respect to time tb.

Delay lines 12, 13 and 14 are determined so that delay line 13 generates an output which is delayed by T/4 with respect to the output of delay line 12 and delay line 14 generates an output which is advanced by T/4 with respect to the output of delay line 12. Thus, the CMI coded binary signal is sampled by flip-flops 15 and 16 at times which are respectively delayed and advanced by T/4 with respect to the clock signal fc which is supplied from VCO 11 to the serial-to-parallel converter 2. The phase of VCO 11 is exclusively determined by the operating characteristic of the low-pass filter 10, the VCO is free from phase jitter even if the clock frequency is high.

The embodiment of FIG. 2 is advantageous over the FIG. 1 embodiment in that it eliminates the need for adjusting the resonant frequency of the tank circuit 6 whenever there is an alteration of the clock frequency of the incoming bit stream, makes it adaptable to integrated circuit technology and provides freedom from phase jitter which would be generated by the tank circuit due to a decrease in the Q value when the input bit rate is high.

What is claimed is:

1. A digital transmission system comprising:
   a phase-locked loop having a low-pass filter, a voltage-controlled oscillator connected thereto, and a phase comparator for supplying to said low-pass filter a signal which is representative of the phase difference between an incoming two-level data bit stream and an output of said voltage-controlled oscillator and for generating a first clock signal from said voltage-controlled oscillator;
   first means including frequency dividing means for deriving a second clock signal from said first clock signal and means for converting said incoming data bit stream into a plurality of first parallel data bit streams synchronized with said second clock signal, said second block signal having a frequency which is lower than the frequency of said first clock signal;
   second means for deriving a third block signal from said second clock signal and for converting said first parallel data bit streams into a plurality of second parallel data bit streams synchronized with said third clock signal, said third clock signal having a frequency which is higher than the frequency of said second clock signal; and
   third means for converting said second parallel data bit streams into an outgoing multi-level digital signal in response to said third, higher-frequency clock signal.

2. A digital transmission system as claimed in claim 1, further comprising a tank circuit tuned to the frequency of said incoming data bit stream, said phase comparator comparing the output of the tank circuit with the output of said voltage-controlled oscillator.

3. A digital transmission system as claimed in claim 1, wherein said incoming data bit stream comprises a CMI (coded mark inversion) coded binary signal, and wherein said phase comparator comprises a flip-flop having a first input terminal connected to be responsive to said CMI coded binary signal and a second input terminal responsive to the output of said voltage-controlled oscillator for sampling said CMI coded binary signal.

4. A digital transmission system as claimed in claim 3, further comprising:
 delay means for deriving from the output of said voltage-controlled oscillator first and second output signals which are delayed and advanced with respect to the output of said voltage-controlled oscillator by a predetermined amount;
 second and third flip-flops each having a first input terminal connected to be responsive to said CMI coded binary signal and a second input terminal, the second input terminals of said second and third flip-flops being connected to be responsive to said first and second output signals of said delay means, respectively, for sampling said CMI coded binary signal at times respectively delayed and advanced with respect to the time at which the CMI coded binary signal is sampled by the first-mentioned flip-flop; and
 means for decoding the outputs of said second and third flip-flops and supplying a decoded output signal to said first means.

5. A circuit for detecting a CMI (coded mark inversion) coded binary signal comprising:
 a first flip-flop having a first input terminal responsive to a CMI coded binary signal for sampling it in response to a signal applied to a second input terminal thereof;
 a low-pass filter connected to the output of said first flip-flop;
 a voltage-controlled oscillator connected to said low-pass filter for generating a clock pulse at a frequency which is variable as a function of an output signal from said low-pass filter;
 delay means for delaying the output of said voltage-controlled oscillator and generating first, second and third output signals so that said first and second output signals are respectively delayed and advanced with respect to said third output signal by a predetermined amount and for supplying said third output signal to said second input terminal of said first flip-flop; and
 second and third flip-flop each having a first input terminal connected to be responsive to said CMI coded binary signal and a second input terminal, the second input terminals of said second and third flip-flops being connected to be responsive to said first and second output signals of said delay means, respectively, for sampling said CMI coded binary signal at times respectively delayed and advanced with respect to the times at which the CMI coded binary signal is sampled by said first flip-flop.

6. A digital transmission system comprising:
 a phase-locked loop having a low-pass filter, a voltage controlled oscillator connected thereto, and a phase comparator for supplying a signal to said low-pass filter, said signal being representative of the phase difference between an incoming CMI (coded mark inversion) signal and an output of said voltage-controlled oscillator and for generating a first clock signal from said voltage-controlled oscillator, said phase comparator comprising a first flip-flop having a first input terminal connected to be responsive to said CMI signal for sampling said CMI signal in response to a signal supplied to a second input terminal thereof to generate said phase difference signal;
 serial-to-parallel converting means for deriving a second clock signal from said first clock signal and for converting said incoming data bit stream into a plurality of parallel data bit streams which are synchronized with said second clock signal;
 delay means for delaying the output of said voltage-controlled oscillator and generating first, second and third output signals so that said first and second output signals are respectively delayed and advanced by a predetermined amount with respect to said third output signal and applying said third output signal to said second input terminal of said first flip-flop;
 second and third flip-flops each having a first input terminal connected to be responsive to said CMI signal and having a second input terminal, the second input terminals of said second and third flip-flops being connected to be responsive to said first and second output signals of said delay means, respectively, for sampling said CMI signal at times which are respectively delayed and advanced with respect to the time at which the CMI signal is sampled by said first flip-flop; and
 means for decoding the outputs of said second and third flip-flops and for supplying a decoded output signal to said serial-to-parallel converting means as said incoming CMI signal.

7. A digital transmission system comprising:
 a phase-locked loop having a low-pass filter, a voltage-controlled oscillator connected thereto, and a phase comparator for supplying to said low-pass filter a signal which is representative of the phase difference between an incoming two-level data bit stream and an output of said voltage-controlled oscillator and for generating a first clock signal from said voltage-controlled oscillator;
 serial-to-parallel converting means including frequency dividing means for deriving a second clock signal form said first clock signal, and means for converting said incoming data bit stream into a plurality of parallel data bit streams which are synchronized with said second clock signal, said second lock signal having a frequency which is lower than the frequency of said first clock signal; and
 means for deriving a third clock signal from said second clock signal and for converting said first parallel data bit streams into a plurality of second parallel data bit streams synchronized with said third clock signal, said third clock signal having a frequency which is lower than the frequency of said first clock signal; and
 means for deriving a third clock signal from said second clock signal and for converting said first parallel data bit streams into a plurality of second parallel data bit streams synchronized with said third clock signal, said third clock signal having a frequency which is higher than the frequency of said second clock signal.

* * * * *

UNITED STATES PATENT AND TRADEMARK OFFICE
CERTIFICATE OF CORRECTION

PATENT NO.   : 4,823,363
DATED        : April 18, 1989
INVENTOR(S)  : Yasuharu Yoshida It is certified that error appears in the above-identified patent and that said Letters Patent is hereby corrected as shown below:

Drawings,
Add Fig. 3 as per attached.

Column 6,
Line 48, delete "form" and insert -- from --
Line 52, delete "lock" and insert -- clock --
Lines 59-66, delete the duplicated text "lower than the frequency of said first clock signal; and means for deriving a third clock signal from said second clock signal and for converting said first parallel data bit streams into a plurality of second parallel data bit streams synchronized with said third clock signal, said third clock signal having a frequency which is"

Signed and Sealed this

Twenty-second Day of July, 2003

JAMES E. ROGAN
*Director of the United States Patent and Trademark Office*